(12) United States Patent
Bashford et al.

(10) Patent No.: US 7,676,613 B2
(45) Date of Patent: Mar. 9, 2010

(54) METHODS AND STRUCTURE FOR ASSURING CORRECT DATA ORDER IN SATA TRANSMISSIONS OVER A SAS WIDE PORT

(75) Inventors: Patrick R. Bashford, Fort Collins, CO (US); Brian A. Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1462 days.

(21) Appl. No.: 10/910,594

(22) Filed: Aug. 3, 2004

(65) Prior Publication Data
US 2006/0031612 A1   Feb. 9, 2006

(51) Int. Cl.
G06F 13/12 (2006.01)
G06F 3/00 (2006.01)
(52) U.S. Cl. ............. 710/74; 710/36; 710/40; 710/62; 710/65; 370/466; 370/467
(58) Field of Classification Search ......... 709/249, 709/220; 710/40, 74, 36, 62, 65; 711/111; 718/106; 370/466, 467
See application file for complete search history.

(56) References Cited

U.S. PATENT DOCUMENTS

| 6,098,109 | A  | * | 8/2000  | Kotzur et al.   | 709/249 |
| 6,134,630 | A  | * | 10/2000 | McDonald et al. | 711/114 |
| 6,493,750 | B1 | * | 12/2002 | Mathew et al.   | 709/220 |
| 6,965,956 | B1 | * | 11/2005 | Herz et al.     | 710/74  |
| 2002/0184417 | A1 | * | 12/2002 | Lin et al.   | 710/74  |
| 2005/0108452 | A1 | * | 5/2005  | Loffink      | 710/74  |
| 2005/0125574 | A1 | * | 6/2005  | Foster et al.| 710/36  |
| 2005/0138154 | A1 | * | 6/2005  | Seto         | 709/223 |
| 2005/0235072 | A1 | * | 10/2005 | Smith et al. | 710/22  |

OTHER PUBLICATIONS

'T10/03-131r1 SAS Model for use of Affiliation' by Bob Sheffield, Intel Corporation, Mar. 20, 2003.*

* cited by examiner

*Primary Examiner*—Henry W. H. Tsai
*Assistant Examiner*—Steven G Snyder
(74) *Attorney, Agent, or Firm*—Duft Bornsen & Fishman LLP (57) ABSTRACT

Methods and associated structure to assure correct order in delivery of SATA frames over a SAS wide port. In one aspect hereof, new connection requests from a SATA device are rejected until prior frames residing in receive buffers of the SAS/SATA controller are properly processed. In another aspect, when a device is already connected to the controller, the SAS/SATA controller may prevent return of a receiver ready primitive in response to a transmitter ready primitive until previously received frames are removed from the receive buffers.

20 Claims, 4 Drawing Sheets

METHODS AND STRUCTURE FOR ASSURING CORRECT DATA ORDER IN SATA TRANSMISSIONS OVER A SAS WIDE PORT

BACKGROUND OF THE INVENTION

1. Field of the Invention

The invention relates generally to serial interface storage systems and more specifically relates to methods and structures for assuring proper data order in delivering SATA (Serial ATA) frames from a SATA device to a SAS/SATA controller over a SAS (Serial Attached SCSI) wide port.

2. Discussion of Related Art

As computing application performance demands have increased, so too have performance and capacity demands on storage systems utilized in conjunction with computing systems. Storage systems such as disk storage system now provide storage capacities of hundreds of gigabytes or terabytes. To improve both performance and reliability, it is common that storage systems provide a plurality of storage devices and storage controllers all operable in parallel and often providing redundancy. Parallel operation of multiple devices within a storage system may improve performance by distributing I/O operations over a plurality of such storage devices operating substantially in parallel. Reliability is improved by providing redundancy of the devices as well as redundant information such that the failure of a particular storage device does not cause failure of the entire system nor loss of data. Rather, continued operation of the storage system may be provided though possibly in a degraded state and any lost data may be recovered from redundant information stored on other storage devices still operating. Such techniques are often referred to as redundant arrays of inexpensive disks or RAID. Numerous types of RAID storage management (referred to a RAID levels) are generally known in the art providing varying degrees of redundancy to improve reliability with and without so-called striping to distribute data over a plurality of parallel operating devices.

As such high performance, high reliability storage systems evolved, they have migrated from strict parallel SCSI interfaces to more advanced high speed serial interfaces. SCSI (small computer systems interface) originated as a specification for a parallel bus structure and an associated command and status protocol. Over time, the SCSI specification has largely separated the command and status protocol standards from the transmission medium standards used for exchange of such commands and status information. It is common these days to utilize SCSI command and status protocols over other transmission media including, for example, high speed serial interfaces. Serial attached SCSI ("SAS") devices utilize such high speed serial interfaces coupled with SCSI command and status protocols.

Yet another step in the evolution of storage systems has been the use of lower cost ATA (AT Attachment also referred to as IDE) storage devices (i.e., ATA disk drives) within the high performance high reliability storage system. These lower cost ATA storage devices provide similar performance and reliability as compared to high performance, high reliability, SCSI storage devices but do so at substantially lower cost due in large part to market forces. Such ATA storage devices are known to be utilized in high speed, high reliability storage systems through use of SATA (serial ATA) protocols. The SATA standards generally define protocols for exchanging ATA command and status information over SAS media and protocols.

Specifications for the various SCSI, SAS and SATA standards are well known to those of ordinary skill in the art and are widely available located at, for example, the website www.t10.org.

One beneficial feature of the SAS protocols and transmission media is the definition and utilization of so called "wide ports". A SAS wide port is a logical grouping or aggregation of multiple physical transmission links (e.g., multiple PHY links). The aggregation of multiple PHY links into a single SAS wide port allows for overlap and parallelism in the communication of I/O requests between a host based SAS controller and a SAS device (through any intermediate SAS expanders as required).

The SAS specifications generally permits all ports of a wide port to be used concurrently for different I/O exchanges. However, for any single I/O exchange, the SAS specifications impose a restriction that only one port at a time to be used in the multiple ports that make up a SAS wide port. However, the transmission of a next frame may commence on another port of the wide port immediately following completion of transmission of a preceding frame on another port. As the frames may be buffered at the receiving end and the processing of frames may vary in duration, a process or standard is required to be certain that the received frames are processed in the intended order. In standard SCSI transmissions over a SAS link including a SAS wide port, sequencing information is embedded within the exchanged information to assure that frames delivered over different PHY links of the wide SAS port will be processed in the appropriate sequence at the receiving end of the transmission. Thus, multiple frames may be transmitted over different PHY links of the SAS wide port and the intrinsic sequencing information within each transmitted frame may be relied upon to ensure proper ordering of the received frames in any further processing.

A problem arises however in processing of SATA frames over a SAS wide port. Unlike SCSI transmissions over a SAS wide port, SATA frames include no intrinsic sequencing or ordering information. It is therefore a problem to assure proper ordering or sequencing of received frames when SATA transmissions are exchanged over a SAS wide port. Modifying the SATA transmission frames to include intrinsic ordering or sequencing information is generally not desirable because corresponding changes would be required in each cooperating SAS/SATA controller and SATA device. Such custom changes to SATA devices may be impractical in many applications. One approach is to simply avoid the problem by restricting the use of such SAS wide ports where SATA exchanges are anticipated. Again, such a restriction may be impractical in many common applications including, in particular, applications where both SCSI SAS transmissions and SATA SAS transmissions are commingled within a single SAS domain.

It is evident from the above discussion that a need exists for an improved method and structure for ensuring proper ordering or sequencing of SATA frames exchanged between a SAS/SATA controller and a SATA device through a SAS wide port.

SUMMARY OF THE INVENTION

The present invention solves the above and other problems, thereby advancing the state of the useful arts, by providing methods and structures for assuring proper ordering of received SATA frames by preventing transmission of a next SATA frame while a previously transmitted SATA frame remains in a receive buffer awaiting further processing. In one aspect hereof, the SAS/SATA controller prevents the opening of a new connection to a SATA device while a previously received frame from the same device remains in the foreign receive buffers associated with the corresponding PHY link or while a frame from a different device presently resides in the native receive buffer associated with the corresponding PHY link. In another aspect hereof, the SAS/SATA controller prevents the return of a SATA R_RDY (receiver ready) primitive to a SATA device in response to receipt of a SATA X_RDY (transmitted ready) primitive while a previously received frame from the same device remains in the foreign receive buffers associated with the connected PHY link or while a frame from a different device presently resides in the native receive buffer associated with the connected PHY link.

A first feature hereof provides a SAS/SATA controller for coupling a host system to one or more SATA devices via a SAS wide port, the SAS/SATA controller comprising: a plurality of link layer processing elements collectively coupled to the SAS wide port wherein each link layer processing element is associated with connection status information regarding any SATA device communicatively coupled thereto; a plurality of receive buffers each associated with a corresponding link layer processing element of the plurality of link layer processing elements wherein each receive buffer is associated with receive status information regarding one or more received frames stored therein; and a transmission controller, coupled to the plurality of link layer processing elements and coupled to the plurality of receive buffers, to controllably prevent transmissions of frames from an identified SATA device wherein the transmission controller is adapted to use the receive status information of each receive buffer such that at any particular point in time only one receive buffer of the plurality of receive buffers stores any frames received from the identified SATA device.

Another aspect hereof further provides that the receive status information includes a received frame resident status indicia and an associated SATA device ID for a received frame and wherein each receive buffer of the plurality of receive buffers further comprises: a frame received active indicator for storing a received frame resident status indicia indicating storage of a received frame in the corresponding receive buffer; and a device ID indicator for storing the device ID of the SATA device that transmitted the corresponding received frame.

Another aspect hereof further provides that the transmission controller further comprises: control logic to prevent transmissions of frames from a SATA device having a device ID equal to the device ID stored in the device ID indicator of any receive buffer that has its frame received active indicator indicative of a received frame present in the corresponding receive buffer.

Another aspect hereof further provides that the transmission controller designates for each link layer processing element a corresponding receive buffer as the native buffer for said each link layer processing element and designates all other receive buffers as foreign buffers for said each link layer processing element and wherein the transmission controller further comprises: control logic to prevent transmissions of frames from a SATA device over a transmitting link layer processing element of the plurality of link layer processing elements where the device attempting to transmit a frame has a device ID value equal to the device ID value in the device ID indicator of any of the foreign buffers of the transmitting link layer processing element that have the corresponding frame received indicator set or where the device attempting to transmit a frame has a device ID value not equal to the device ID value in the device ID indicator of the native buffer of the transmitting link layer processing element and the native buffer has its received buffer indicator set.

Another aspect hereof further provides that the transmission controller is operable in response to the receive status information and connection status information associated with each of the plurality of link layer processing elements and wherein the connection status information includes a current connected device ID indicia, a connection request device ID indicia and a presently connected status indicia and wherein each link layer processing element of the plurality of link layer processing elements includes: a current connected device ID indicator for storing the current connected device ID indicia associated with said each link layer processing element; a connection request device ID indicator for storing the connection request device ID indicia associated with said each link layer processing element; and a presently connected status indicator for storing the presently connected status indicia associated with said each link layer processing element.

Another aspect hereof further provides that the transmission controller further comprises: control logic to prevent granting of a requested connection received on a link layer processing element where the connection request ID indicia associated with the link layer processing element is equal to the device ID indicia in any receive buffer of the plurality of receive buffers for which the frame received active indicator is set.

Another aspect hereof further provides that the transmission controller designates for each link layer processing element of the plurality of link layer processing elements a corresponding receive buffer as the native buffer for said each link layer processing element and designates all other receive buffers as foreign buffers with respect to said each link layer processing element and wherein the transmission controller further comprises: control logic to prevent granting of a requested connection from a SATA device over a transmitting link layer processing element of the plurality of link layer processing elements where the device requesting a connection has a device ID value equal to the device ID value in the device ID indicator of any of the foreign buffers of the transmitting link layer processing element that have the corresponding frame received indicator set or where the device requesting a connection has a device ID value not equal to the device ID value in the device ID indicator of the native buffer of the transmitting link layer processing element and the native buffer has its received buffer indicator set.

A second feature hereof provides a system comprising: a host system; a SAS/SATA controller within the host system; a SATA device; and a SAS expander coupled between the SAS/SATA controller and the SATA device, wherein the SAS expander is coupled to the SAS/SATA controller via a SAS wide port, and wherein the SAS/SATA controller further comprises: a plurality of link layer processing elements coupling the SAS/SATA controller to the SAS wide port; a plurality of receive buffers each associated with a corresponding link layer processing element of the plurality of link layer processing elements; and a transmission blocker to prevent frame transmission from an identified SATA device using status information associated with each receive buffer such that at any particular point in time only one receive buffer of the plurality of receive buffers stores any frames received from the identified SATA device.

Another aspect hereof further provides that the transmission blocker further comprises: a flow control signal generator to controllably preclude transmission of a next frame in response to said status information.

Another aspect hereof further provides that the transmission blocker further comprises: a connection control element to controllably preclude opening of a connection in response to said status information.

Another aspect hereof further provides that the status information includes connection status information relating to connections with SATA devices involving any of the plurality of link layer processing elements and wherein the transmission blocker further comprises: a connection detector for detecting whether the SATA device associated with the earlier transmitted frame has a current connection to the host system; a flow control signal generator, operable in response to detecting that the SATA device has a current connection to the host system, to controllably preclude transmission of frames in response to said status information; and a connection control element, operable in response to detecting that the SATA device presently has no connection to the host system, to controllably preclude opening of a connection in response to said connection status information.

Another aspect hereof further provides that the controller is operable to designate for each link layer processing element of the plurality of link layer processing elements a corresponding receive buffer as the native buffer for said each link layer processing element and is operable to designate all other receive buffers as foreign buffers for said each link layer processing element and wherein the transmission blocker further comprises: comparison logic coupled to the plurality of receive buffers and coupled to the plurality of link layer processing elements wherein the comparison logic is operable to control the transmission blocker to prevent transmission of frames from the SATA device such that a next frame from an identified SATA device coupled to a transmitting link layer processing element of the plurality of link layer processing elements is held off if the native buffer associated with the transmitting link layer processing element presently stores a received frame from another SATA device or is held off if any of the foreign buffers associated with the transmitting link layer processing element presently store a received frame from the transmitting device.

Another aspect hereof further provides that the status information includes connection status information relating to connections made with any of the plurality of link layer processing elements and wherein the comparison logic is operable prevent granting of a connection request from a requesting SATA device over the transmitting link layer processing element in response to a determination that the native buffer associated with the transmitting link layer processing element presently stores a received frame from another SATA device or prevents granting of the connection request if any of the foreign buffers associated with the transmitting link layer processing element presently store a received frame from the requesting device.

A third feature hereof provides a method operable in a SAS/SATA controller adapted for coupling to a SATA device via a SAS wide port comprising multiple links and the controller having multiple receive buffers each associated with a corresponding one of the multiple links, the method comprising: receiving a frame from a transmitting SATA device via a link layer processing element coupled to the SAS wide port; storing the received frame in a receive buffer associated with the link layer processing element; blocking frame transmissions from the transmitting SATA device such that at any particular point in time only one receive buffer of the plurality of receive buffers stores any frames received from the transmitting SATA device.

Another aspect hereof further provides that the step of storing further comprises: setting a received frame indicator associated with the receive buffer to indicate presence of a received frame in the corresponding receive buffer; and setting a device ID indicator associated with the receive buffer to indicate the device ID of the transmitting SATA device that transmitted the received frame.

Another aspect hereof further provides that the step of blocking further comprises: holding offsetting a receiver ready status on the SAS wide port to prevent transmission of another frame from the transmitting SATA device.

Another aspect hereof further provides that the method further comprises: designating for each link of the multiple links a corresponding receive buffer as the native buffer for said each link; and designating all other receive buffers as foreign buffers for said each link.

Another aspect hereof further provides that the step of holding off further comprises: holding off setting a receiver ready status on the SAS wide port to prevent transmission of another frame from the transmitting SATA device in response to detecting that the device ID of the SATA device attempting to transmit a next frame matches the device ID stored in the device ID indicator of any of the plurality of receive buffers where the associated received frame indicator is also set.

Another aspect hereof further provides that the step of holding off further comprises: preventing transmissions of frames from a SATA device over a transmitting link of the plurality of links where the device attempting to transmit a frame has a device ID value equal to the device ID value in the device ID indicator of any of the foreign buffers of the transmitting link that have the corresponding frame received indicator set or where the device attempting to transmit a frame has a device ID value not equal to the device ID value in the device ID indicator of the native buffer of the transmitting link and the native buffer has its received buffer indicator set.

Another aspect hereof further provides that the step of blocking further comprises: rejecting an open request from a transmitting device having a device ID matching the device ID stored in the device ID indicator of any of the plurality of receive buffers where the associated received frame indicator is also set.

DETAILED DESCRIPTION OF THE DRAWINGS

Figure 1:
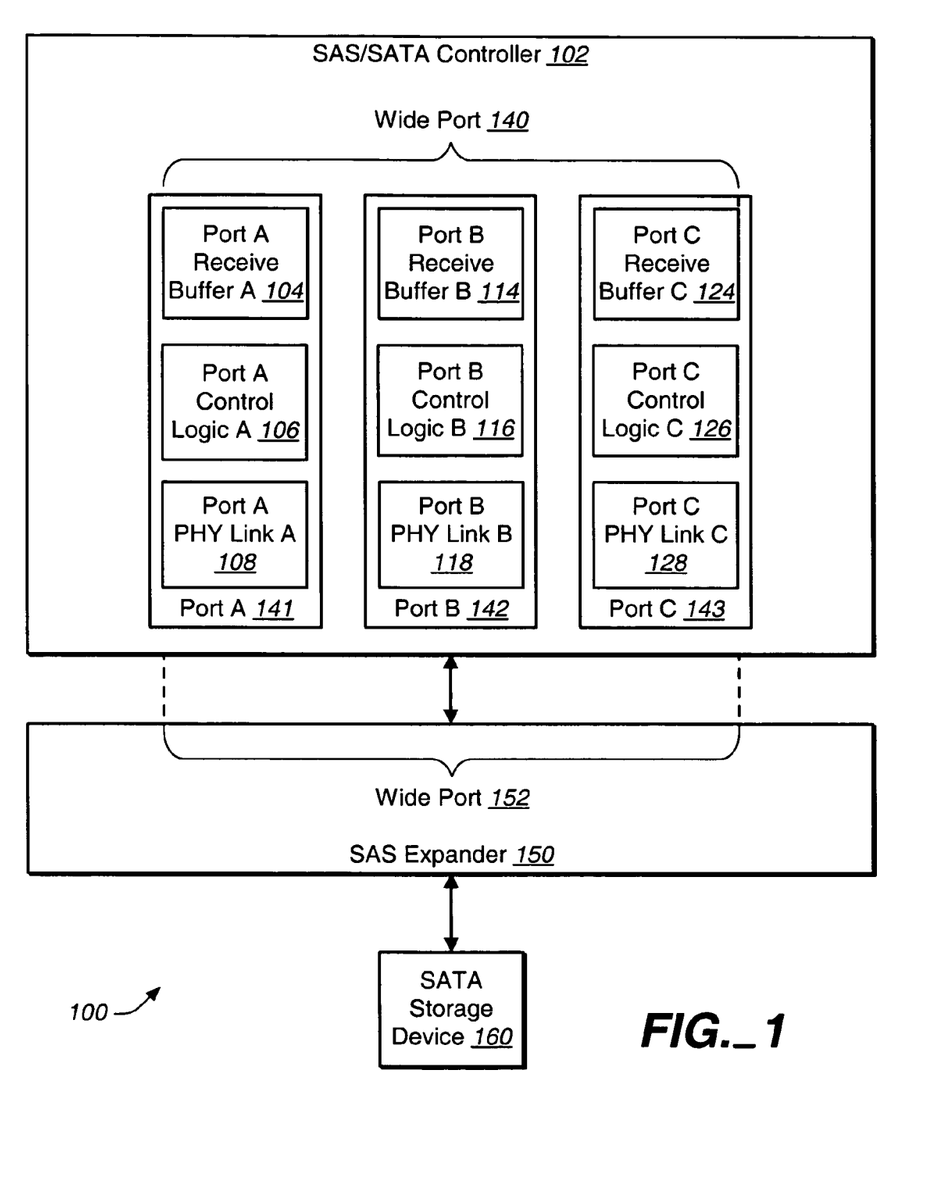
FIG. 1 is a block diagram of a system including a SAS/SATA controller enhanced with features and aspects hereof.

FIG. 1 is a block diagram of a system 100 including a SAS/SATA controller 102 adapted for exchanging information with SATA device 160. SAS/SATA controller 102 may be a storage controller physically housed within an associated host system (not shown) or may be a storage controller physically housed within a storage subsystem that, in turn, exchanges information with attached host systems. SATA device 160 may be, for example, an SATA disk drive or other storage device such as optical storage devices, tape storage devices, etc. Further, those of ordinary skill in the art will recognize that SATA device 160 may be an arrayed storage device comprising a plurality of disk drives as or other storage devices where the entire array is adapted for SATA command and status exchanges with an appropriate SAS/SATA controller 102.

As is common in the storage arts, SAS/SATA controller 102 and SATA device 160 may be coupled in a SAS domain through ports of a SAS expander 150. SATA device 160 may be coupled to SAS expander 150 through a single PHY link or port of the expander 150. SAS/SATA controller 102 may be coupled to SAS expander 150 through multiple PHY links that together comprise wide port 152 of the expander 150.

Wide port 140 within SAS/SATA controller 102 couples controller 102 to the corresponding wide port 152 of SAS expander 150. In accordance with features and aspects hereof, each of the multiple ports that comprise wide port 140 is associated with a corresponding receive buffer, control logic, and a PHY link controller. For example, as shown in FIG. 1, wide port 140 is made up of three physical ports, port A 141, port B 142 and port C 143. Port A 141 is associated with receive buffer A 104, control logic A 106, and PHY link A 108. Port B 142 is associated with receive buffer B 114, control logic B 116, and PHY link B 118. Port C 143 of wide port 140 is associated with receive buffer C 124, control logic C 126, and PHY link C 128. Other elements associated with transmission control through each of the ports (141, 142 and 143) of SAS wide port 140 will be readily apparent to those of ordinary skill in the art and need not be discussed further herein nor shown in the figures.

Each receive buffer (104, 114 and 124) is used for storing received frames from one or more SATA devices 160 coupled to SAS/SATA controller 102. The receive buffers (104, 114 and 124) may be implemented as any suitable memory device providing required performance for storing and retrieving received frames and associated identification information. As discussed further herein below, a received frame may be stored with identification information indicating the particular SATA device that generated and transmitted the associated received frame.

The PHY link (108, 118 and 128) of the physical ports of wide port 140 represent appropriate circuits and logic for controlling signaling over the high speed serial physical link. Logic for such manipulation of a SAS high speed serial link is well known to those of ordinary skill in the art and is readily available as commercial products as well as embedded circuit designs for integration within other integrated circuits.

Control logic (106, 116 and 126) provides control associated with features and aspects hereof to ensure proper ordering or sequencing of SATA frames received from SATA device 160 through the coupled SAS wide ports 140 and 152 and SAS expander 150. In particular, as discussed further herein below, control logic (106, 116 and 126) provides suitable control for ensuring that no further frame transmissions are allowed from a particular SATA device while the previous frame remains to be processed from that same device in any of the associated receive buffers (104, 114 and 124). Further, control logic (106, 116 and 126) may provide controls to reject an open connection request from a SATA device 160 while a previously received frame associated with the same SATA device from an earlier connection still resides within any of the receive buffers 104, 114 and 124. Details of the operation of such control logic are discussed further herein below. In addition, each receive buffer (104, 114 and 124) is considered the "native buffer" relative to a corresponding control logic. Other receive buffers are therefore deemed "foreign buffers" with respect to that control logic. Details of such a logical designation and use of that designation is discussed in further detail herein below.

Those of ordinary skill in the art will recognize a wide variety of similar system configurations wherein a SAS/SATA controller 102 is coupled to one or more SATA devices 160 through a SAS wide port 152 of a SAS expander 150. In particular, the number of SAS expanders between such a controller 102 and a storage device 160 may be any desired number of SAS expanders. Further, the number of physical ports (141, 142 and 143 of wide port 140) aggregated to logically define the desired wide port may be any appropriate number of physical ports. The depiction of a single SAS expander 150 and three physical ports comprising the associated wide port 140 of controller 102 are therefore merely intended as representative of one exemplary configuration in which features and aspects hereof may be beneficially applied.

Still further, those of ordinary skill in the art will recognize that although features and aspects hereof restrict the transmission of SATA frames over a SAS wide port, no such restrictions need be imposed for exchange of standard SCSI SAS frames over the same ports of the SAS wide port. SAS specifications adequately allow for assuring proper ordering in the processing of received SAS frames. In other words, the receive buffers and associated control logic providing features and benefits hereof are preferably operable only to restrict exchange of SATA frames. While SATA exchanges may be restricted, the receive buffers may be freely used for normal reception and processing of SAS frames. Thus, SAS SCSI frames may be exchanged over the wide port of FIG. 1 unfettered by improved features and aspects hereof to restrict the exchange of SATA frames.

Figure 2:
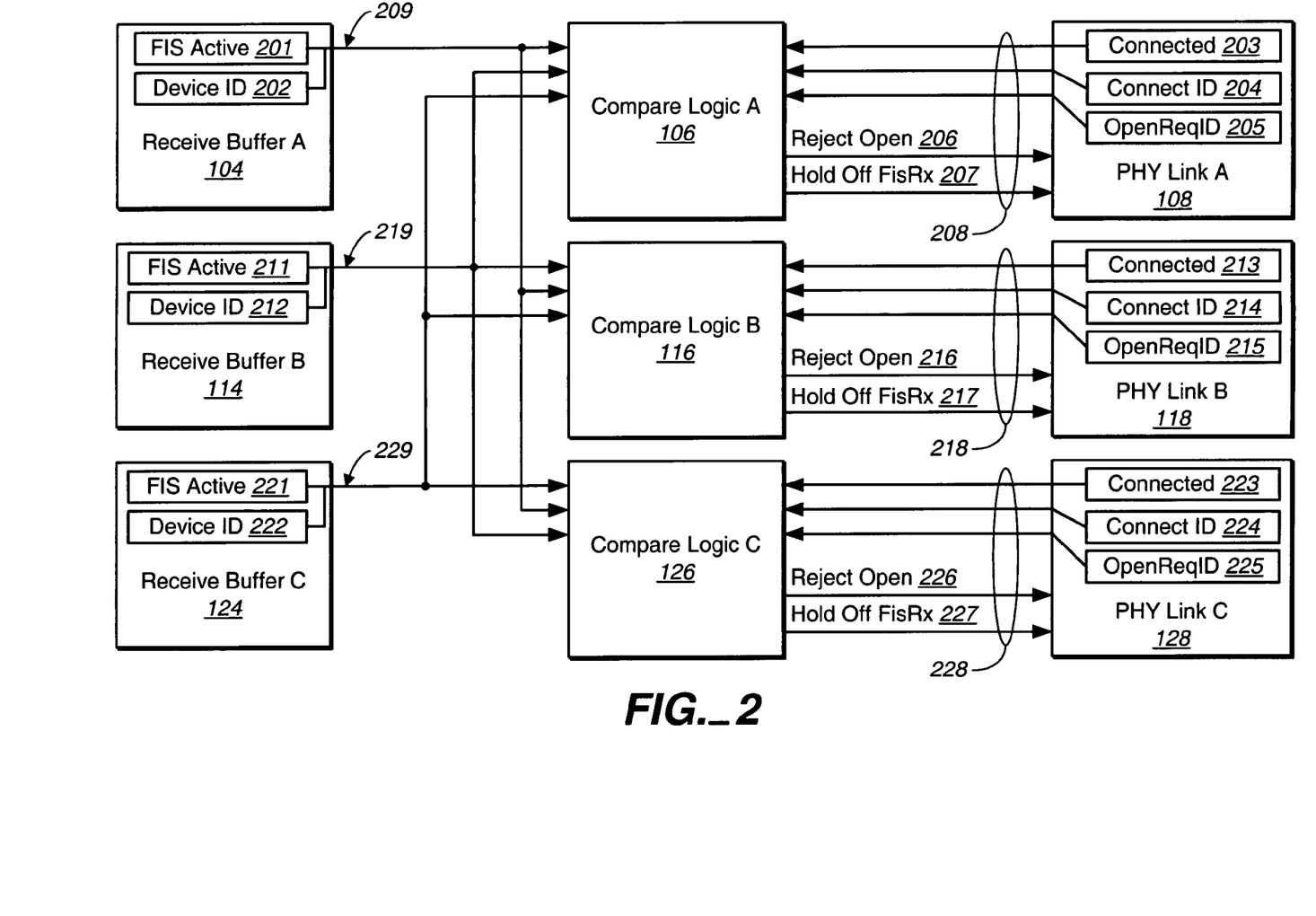
FIG. 2 is a block diagram providing additional details of an exemplary embodiment of a SAS/SATA controller as in FIG. 1.

FIG. 2 is a block diagram providing additional details of an exemplary embodiment of a SATA storage controller providing features and aspects hereof to ensure proper ordering of SATA frames transmitted and received over a SAS wide port. Each receive buffer includes an indicator for storing an active flag and a device ID. Specifically, receive buffer A 104 includes an active flag 201 indicator and a device ID 202 indicator. Receive buffer B 114 includes an active flag indicator 211 and a device ID indicator 212. Receive buffer C 124 includes active flag indicator 221 and device ID indicator 222. The active flag indicator in each receive buffer is used to indicate that a frame is presently stored in the receive buffer while the device ID indicator is used to store and SATA device ID corresponding to the SATA device that transmitted the frame presently residing in the corresponding receive buffer. These indicator values are applied to each of a corresponding plurality of compare logic elements 106, 116 and 126 via signal paths 209, 219 and 229, respectively.

Each PHY link 108, 118 and 128 includes indicators for storing status information regarding the corresponding PHY link. A connected flag indicates that the corresponding PHY link is presently connected to some SATA device. When the connected flag is set, the connect ID indicator indicates which SATA device is presently connected to the corresponding PHY link. If not presently connected, a pending request to connect to the PHY link from a SATA device will store indicia of the device ID of the requesting SATA device in a open request ID indicator. Specifically, PHY link A 108 includes connected indicator 203, connect ID indicator 204 and open request ID indicator 205. PHY link B 118 includes connected indicator 213, connect ID indicator 214 and open request ID indicator 215. PHY link C 128 includes connected indicator 223, connected ID indicator 224 and open request ID indicator 225. These values are applied to corresponding compare logic elements 106, 116 and 126 via paths 208, 218 and 228, respectively. Using these various status input signals applied to compare logic elements 106, 116 and 126, the compare logic elements generate control signals to be applied to the corresponding PHY links. Specifically, compare logic A 106 generates a reject open request control signal 206 and a hold off receiver ready control signal 207 for application to PHY link A 108. Compare logic B 116 generates reject open control signal 216 and hold off receiver ready control signal 217 for application to PHY link B 118. Compare logic C 126 generates reject open control signal 226 and hold off receiver ready control signal 227 for application to PHY link C 128.

Based on the control signals generated by the compare logic elements and applied to corresponding PHY links, the logic controlling each PHY link will reject a pending open request or hold off a receiver ready (SATA R_RDY) response to a transmitter ready signal primitive (SATA X_RDY). As discussed in further detail herein below, when the connected indicator for a particular PHY link indicates that there is no present connection between the PHY link and a SATA device, a request to open such a connection will store the device ID for the device requesting the connection in the corresponding open request ID indicator of the PHY link. The corresponding compare logic will then determine whether the pending open request may be granted based on the status of frames presently stored in the receive buffers. If the open request is to be denied, the compare logic will generate a corresponding reject open control signal for application to the PHY link to cause the pending open request to be rejected (and presumably retried by the requesting device at a later time). If the connected indicator of a PHY link indicates that a present connection has been established, the SATA device ID for the connected device is stored in the connect ID indicator of the PHY link and applied to the corresponding compare logic. In such a state, reception of a transmitter ready SATA primitive (SATA X_RDY) causes the compare logic to determine whether a next frame may be received based upon the status of all receive buffers. If a next frame cannot be received at present, the compare logic generates an appropriate hold off receiver ready control signal for application to the PHY link to prevent transmission of the next frame from the requesting transmitter device. Further details of operation of such compare logic are provided herein below.

Those of ordinary skill in the art will recognize that the receive buffer may be adapted to store only a single SATA frame from a given SATA device or multiple SATA frames from one or more SATA devices. Where a receive buffer is adapted to store a single frame, the active flag indicator and device ID indicator store information regarding the presence of the single SATA frame in the receive buffer. Where a receive buffer is adapted to store multiple frames, a device ID indicator may be associated with the storage of each frame in the receive buffer. Thus, features and aspects hereof may permit more complex tests to permit continued operation of a PHY link with respect to SATA devices (or other SAS devices) that need not be blocked to assure proper ordering of SATA frames for a first SATA device ID. Further, those of ordinary skill in the art will recognize that the multiple receive buffers and the multiple compare logic elements may be implemented as distinct circuit devices or may be more tightly coupled as a single integrated circuit device. Further, the compare logic associated with the various port definitions may be implemented as a single logic element that is dynamically and logically associated with particular physical links in accordance with dynamic reconfiguration of the SAS/SATA controller. These and other design choices will be readily apparent to those of ordinary skill in the art. As will be discussed further herein below, limiting each receive buffer to storing frames from a single SATA device simplifies the design of the receive buffers and associated compare logic used to restrict the incoming flow of SATA frames. More complex designs permitting multiple frames from multiple SATA devices within each receive buffer are within the scope of the invention and the modifications to the exemplary designs disclosed herein will be readily apparent to those of ordinary skill in the art.

As shown in FIGS. 1 and 2, each port (141, 142 and 143) of the wide port 140 of the SAS/SATA controller 102 comprises a set of associated elements including a receive buffer, a compare logic element and a PHY link. A receive buffer associated with the PHY link to which a SATA device is connected is referred to herein as the "native" buffer of that connection. In using a wide port, the other ports may be used for exchanging frames as well. The other receive buffers associated with other ports of the wide port are referred to here as "foreign" buffers with respect to the compare logic that is associated with the native receive buffer. For example, with reference to FIG. 2, compare logic 106 refers to receive buffer 104 as a native buffer and refers to buffers 114 and 124 as foreign buffers. Compare logic 116 refers to buffer 114 as native and buffers 104 and 124 as foreign and compare logic 126 refers to buffer 124 as native and buffers 104 and 114 as foreign. As will be seen below, such an identification of native and foreign buffers may be useful in one embodiment for determining when a receiver ready primitive should be blocked or when an open request should be rejected.

Figure 3:
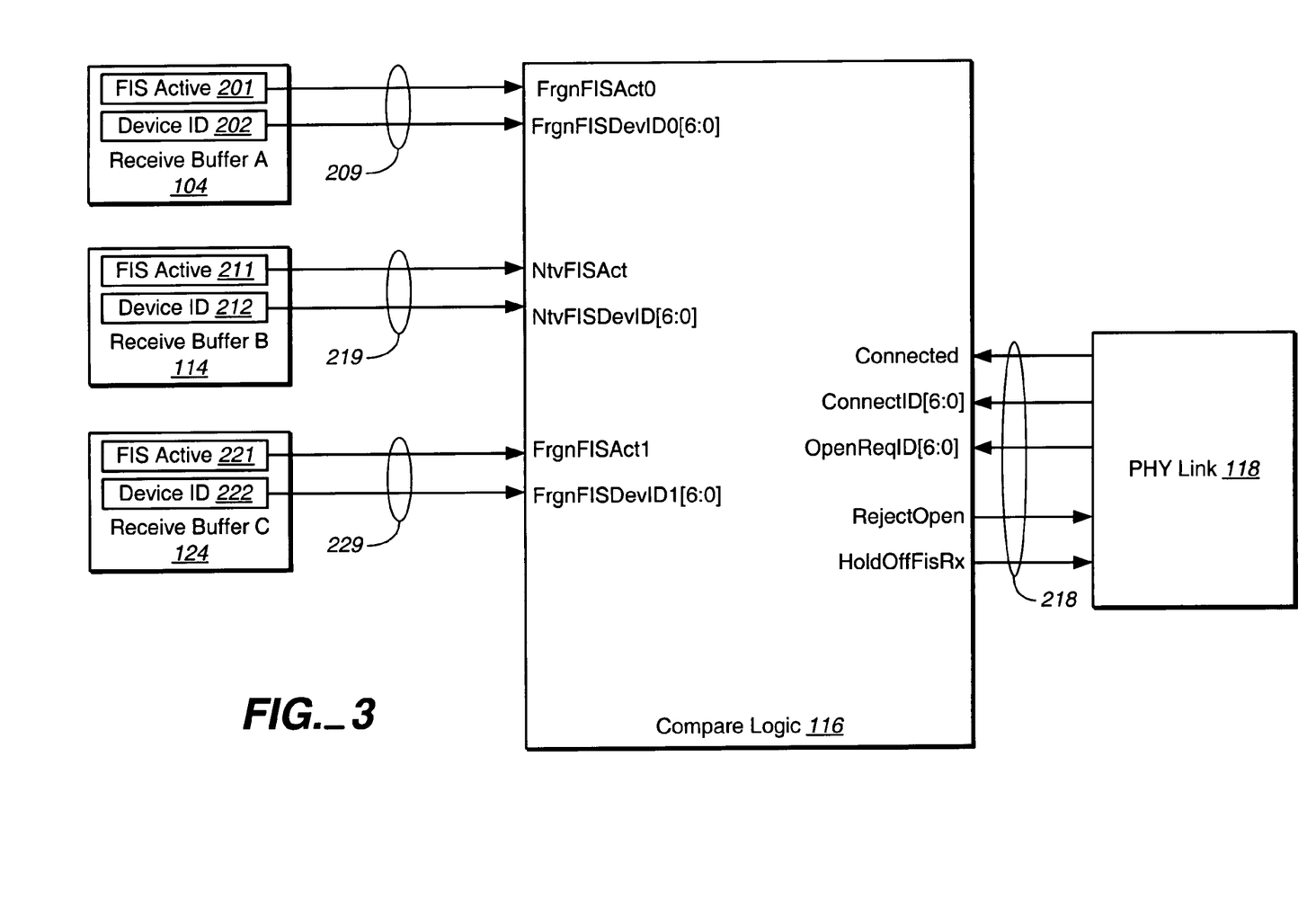
FIG. 3 is a block diagram providing additional details of an exemplary embodiment of a SAS/SATA controller as in FIG. 1.

FIG. 3 is a block diagram providing additional details of an exemplary embodiment of compare logic element 116 as shown above and FIGS. 1 and 2. Compare logic 116 is related to the second of three ports associated with the exemplary wide port configuration (i.e., wide port 140 of SAS/SATA controller 102 of FIG. 1). Compare logic 116, like compare logic 106 and 126, is coupled to the status indicators of all three receive buffers 104, 114 and 124. Specifically, compare logic 116 receives the active indicator 201 and device ID indicator 202 of receive buffer 114 on path 209, receives active indicator 211 and device ID indicator 212 of receive buffer 114 on path 219 and receives active indicator 221 and device ID indicator 222 of receive buffer 124 on path 229.

As noted above, in the depicted exemplary embodiment of FIG. 3, receive buffer B 114 is deemed the "native" receive buffer for compare logic 116. The other two buffers (receive buffer A 104 and receive buffer C 124) are deemed foreign buffers with respect to compare logic 116. Those skilled in the art will recognize that in like manner, compare logic 106 of FIG. 2 may be coupled to receive buffer A 104 as the native receive buffer and receive buffers B 114 and C 124 as foreign buffers. Similarly, compare logic element 126 of FIG. 2 may be coupled to receive buffer C 124 as its native buffer and buffers A 104 and B 114 as foreign buffers.

In general, the exemplary compare logic associated with a particular buffer is adapted to allow any number of frames from a single SATA device to be received and stored within any one of the receive buffers (the native buffer or any of the foreign buffers associated with a particular compare logic and its corresponding link). Thus, frames from any particular SATA device will not be simultaneously stored in more than one buffer leading to possible out of order processing of received frames by higher layer SAS/SATA processing.

Using the signal designations shown within compare logic 116 of FIG. 3, exemplary combinatorial logic that generates a reject open control signal or a hold off receiver ready control signal may be understood by way of the following exemplary HDL excerpts:

RejectOpen Control Signal Generation
OpenReqFrgnMatch=FrgnFISAct0 & (FrgnFISDevID0[6:0] =OpenReqID[6:0])|| FrgnFISAct1 & (FrgnFISDevID1[6: 0]=OpenReqID[6:0]);
OpenReqNtvMatch=NtvFISAct & (NtvFISDevID[6:0] !=OpenReqID[6:0]);
RejectOpen=OpenReqFrgnMatch || OpenReqNtvMatch;
HoldOffFisRx Control Signal Generation
HoldOffFrgnMatch=FrgnFISAct0 & (FrgnFISDevID0[6:0] =ConnectID[6:0]) || FrgnFISAct1 & (FrgnFISDevID1 [6:0]=ConnectID[6:0]);
HoldOffNtvMatch=NtvFISAct & (NtvFISDevID[6:0] !=ConnectID[6:0]);
HoldOffFisRx=HoldOffFrgnMatch || HoldOffNtvMatch;

As shown in FIG. 3, each receive buffer generates a single set of signals indicating that at least one frame is stored therein and indicating the device ID of the device that transmitted that frame or frames. Those of ordinary skill in the art will readily recognize extensions to such a structure where additional signals could be provided to signal that multiple frames received from different transmitting devices are present within. The comparison logic would be commensurately more complex to enforce a restriction that only one of the multiple receive buffers may store frames from any particular transmitting device. Further, the added signals required add complexity and associated costs in the number of paths and interconnects within a custom circuit providing features and aspects hereof. Therefore, the embodiment of FIG. 3 is intended merely as one possible, exemplary embodiment that provides features and aspects hereof without unduly complicating the circuit design or fabrication.

Figure 4:
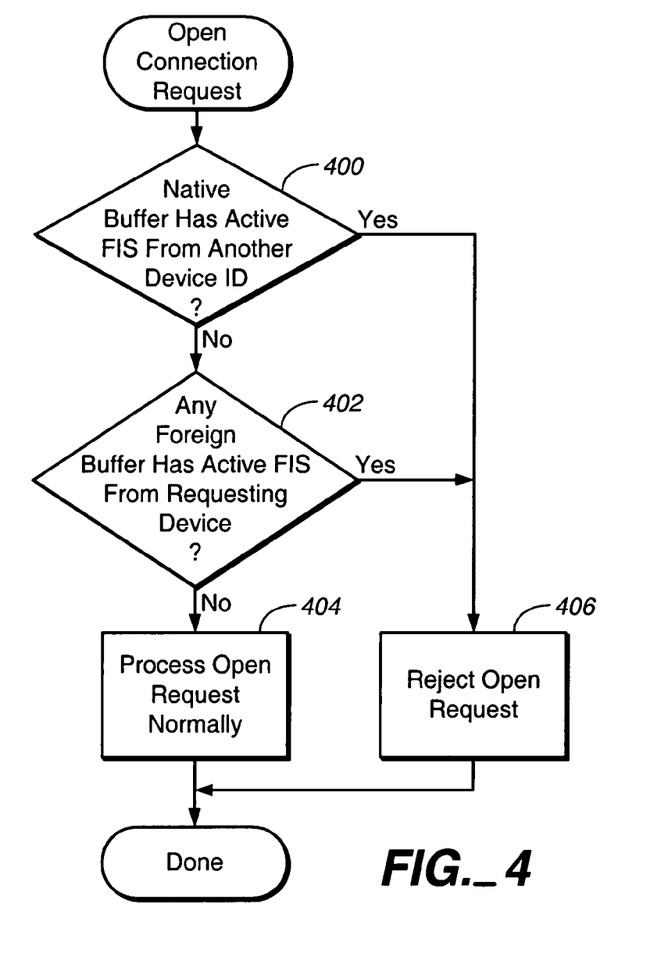
FIG. 4 is a flowchart describing operation of method associated with features and aspects hereof to cause a SAS/SATA controller to prevent new open connection to prevent processing of frames out of order.
Figure 5:
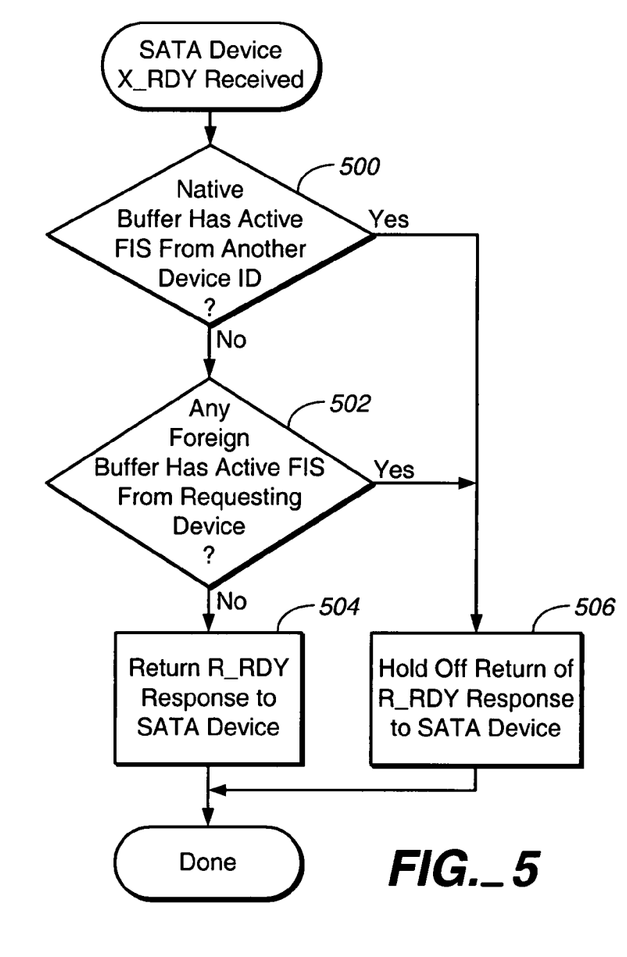
FIG. 5 is a flowchart describing operation of method associated with features and aspects hereof to cause a SAS/SATA controller to hold off return of a receiver ready response to a transmitter ready primitive to prevent processing of frames out of order.

The operation of such combinatorial logic for generating control signals to the physical links may also be understood with reference to the flowcharts of FIGS. 4 and 5. FIG. 4 describes a method associated with features and aspects hereof to generate control signals for rejecting a new open connection request in view of the status of receive buffers associated with the SAS wide port coupling the SAS/SATA controller to the SATA device. Either of two conditions will preclude accepting a request to open a new connection for a SATA device through a particular link and associated compare logic: namely, if the associated native buffer has frames stored within from another device or if any foreign buffers have received frames stored within for the same SATA device requesting the new connection. Element 400 first determines whether the native buffer associated with the comparison logic indicates that it presently has an active frame stored within and, if so, whether that active frame is transmitted from a different device ID than the device ID requesting a new connection. If so, element 406 is operable to reject a new open request. In other words, a reject open request control signal is generated and applied to the associated PHY link to cause the associated PHY link to reject a new open request from a SATA device not presently connected to the wide port.

If element 400 determines that no such received frame from a different device ID is presently active in the native receive buffer, element 402 is next operable to determine whether any of the foreign receive buffers coupled to the compare logic indicate an active frame received from the SATA device requesting that a new connection be established. If so, element 406 is operable as above to generate a control signal to cause the PHY link to reject the new open request. Otherwise, element 404 is operable to permit an open connection request to be processed normally. In other words, a control signal is generated that permits an open request to be granted in accordance with the present state of the receive buffers and the connection state of the associated PHY link.

FIG. 5 describes a method associated with features and aspects hereof to generate control signals for holding off a receiver ready (SATA R_RDY) primitive in response to a transmit ready primitive (SATA X_RDY) transmitted from a SATA device presently connected to the associated PHY link. In response to receipt of such a transmit ready primitive, element 500 is first operable to determine whether the native receive buffer has an active indicator set and, if so, whether the device ID associated with the received frame is for another device other than the device presently connected to the associated PHY link. If so, element 506 is operable to generate a control signal forcing the associated native PHY link logic to hold off return of a receiver ready primitive in response to receipt of the transmitter ready primitive. Otherwise, element 502 is next operable to determine whether any of the foreign receive buffers coupled to the compare logic indicate an active signal representing a received frame present and indicating that the device ID associated with such a received frame is the same as the SATA device ID generating the transmitter ready primitive (i.e., the same device ID as that presently connected to the corresponding PHY link). If so, element 506 is operable as noted above to generate a control signal holding off return of a receiver ready primitive in response to receipt of the transmitter ready primitive from the presently connected SATA device. Otherwise, element 504 is operable to generate a control signal applied to the PHY link to allow generation and return of a receiver ready primitive in response to receipt of the transmitter ready primitive from the presently connected SATA device.

Those of ordinary skill in the art will readily recognize that the methods or processes associated with FIGS. 4 and 5 may be most broadly implemented as custom, combinatorial logic circuits as to noted above with respect to the exemplary HDL excerpts. However, those of ordinary skill in the art will readily recognize that such methods may also be implemented as suitably programmed instructions in an appropriate general or special purpose processor associated with the SAS/SATA controller. Such design choices are readily apparent to those of ordinary skill in the art.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Serial Attached Small Computer System Interface/Serial Advanced Technology Attachment (SAS/SATA) controller for coupling a host system to a plurality of Serial Advanced Technology Attachment (SATA) devices via a Serial Attached Small Computer System Interface (SAS) wide port of the SAS/SATA controller and a SAS expander coupled between the SAS/SATA controller's wide port and the plurality of SATA devices, the SAS/SATA controller comprising:
 a plurality of link controllers that comprise the SAS wide port of the SAS/SATA controller wherein each link controller is associated with connection status information regarding any SATA device communicatively coupled thereto through an intervening SAS expander;

a plurality of receive buffers each associated with a corresponding link controller of the plurality of link controllers wherein each receive buffer is associated with receive status information regarding one or more received frames stored therein; and a transmission control logic, coupled to the plurality of link controllers and coupled to the plurality of receive buffers, to controllably prevent transmissions of frames from an identified SATA device wherein the transmission control logic is adapted to use the receive status information of each receive buffer such that at any particular point in time only one receive buffer of the plurality of receive buffers stores any frames received from the identified SATA device.

2. The SAS/SATA controller of claim 1 wherein the receive status information includes a received frame resident status indicia and an associated SATA device identification (ID) for a received frame and wherein each receive buffer of the plurality of receive buffers further comprises:

a frame received active indicator for storing a received frame resident status indicia indicating storage of a received frame in the corresponding receive buffer; and a device ID indicator for storing the device ID of the SATA device that transmitted the corresponding received frame.

3. The SAS/SATA controller of claim 2 wherein the transmission control logic further comprises:

control logic to prevent transmissions of frames from a SATA device having a device ID equal to the device ID stored in the device ID indicator of any receive buffer that has its frame received active indicator indicative of a received frame present in the corresponding receive buffer.

4. The SAS/SATA controller of claim 2 wherein the transmission control logic designates for each link controller a corresponding receive buffer as a native buffer for said each link controller and designates all other receive buffers as foreign buffers for said each link controller and wherein the transmission control logic further comprises:

control logic to prevent transmissions of frames from a SATA device over a transmitting link controller of the plurality of link controllers where the SATA device attempting to transmit a frame has a device ID value equal to the device ID value in the device ID indicator of any of the foreign buffers of the transmitting link controller that have the corresponding frame received indicator set or where the SATA device attempting to transmit a frame has a device ID value not equal to the device ID value in the device ID indicator of the native buffer of the transmitting link controller and the native buffer has its received buffer indicator set.

5. The SAS/SATA controller of claim 1 wherein the transmission control logic is operable in response to the receive status information and connection status information associated with each of the plurality of link controllers and wherein the connection status information includes a current connected device ID indicia, a connection request device identification (ID) indicia and a presently connected status indicia and wherein each link controller of the plurality of link controllers includes:

a current connected device ID indicator for storing the current connected device ID indicia associated with said each link controller;

a connection request device ID indicator for storing the connection request device ID indicia associated with said each link controller; and a presently connected status indicator for storing the presently connected status indicia associated with said each link controller.

6. The SAS/SATA controller of claim 5 wherein the transmission control logic further comprises:

control logic to prevent granting of a requested connection received on a link controller where the connection request ID indicia associated with the link controller is equal to the device ID indicia in any receive buffer of the plurality of receive buffers for which the frame received active indicator is set.

7. The SAS/SATA controller of claim 5 wherein the transmission control logic designates for each link controller of the plurality of link controllers a corresponding receive buffer as a native buffer for said each link controller and designates all other receive buffers as foreign buffers with respect to said each link controller and wherein the transmission control logic further comprises:

control logic to prevent granting of a requested connection from a SATA device over a transmitting link controller of the plurality of link controllers where the SATA device requesting a connection has a device ID value equal to the device ID value in the device ID indicator of any of the foreign buffers of the transmitting link controller that have the corresponding frame received indicator set or where the SATA device requesting a connection has a device ID value not equal to the device ID value in the device ID indicator of the native buffer of the transmitting link controller and the native buffer has its received buffer indicator set.

8. A system comprising:

a host system;

a Serial Attached Small Computer System Interface/Serial Advanced Technology Attachment (SAS/SATA) controller within the host system;

a Serial Advanced Technology Attachment (SATA) device; and a Serial Attached Small Computer System Interface (SAS) expander coupled between the SAS/SATA controller and the SATA device, wherein the SAS expander is coupled to the SAS/SATA controller via a SAS wide port of the SAS expander, and wherein the SAS/SATA controller further comprises:

a plurality of link controllers comprising a SAS wide port coupling the SAS/SATA controller to the SAS wide port of the SAS expander;

a plurality of receive buffers each associated with a corresponding link controller of the plurality of link controllers; and a transmission blocker to prevent frame transmission from an identified SATA device using status information associated with each receive buffer such that at any particular point in time only one receive buffer of the plurality of receive buffers stores any frames received from the identified SATA device.

9. The system of claim 8 wherein the transmission blocker further comprises:

a flow control signal generator to controllably preclude transmission of a next frame in response to said status information.

10. The system of claim 8 wherein the transmission blocker further comprises:

a connection control element to controllably preclude opening of a connection in response to said status information.

11. The system of claim 8 wherein the status information includes connection status information relating to connections with SATA devices involving any of the plurality of link controllers and wherein the transmission blocker further comprises:
   a connection detector for detecting whether the SATA device associated with the earlier transmitted frame has a current connection to the host system;
   a flow control signal generator, operable in response to detecting that the SATA device has a current connection to the host system, to controllably preclude transmission of frames in response to said status information; and
   a connection control element, operable in response to detecting that the SATA device presently has no connection to the host system, to controllably preclude opening of a connection in response to said connection status information.

12. The system of claim 8 wherein the controller is operable to designate for each link controller of the plurality of link controllers a corresponding receive buffer as a native buffer for said each link controller and is operable to designate all other receive buffers as foreign buffers for said each link controller and wherein the transmission blocker further comprises:
   comparison logic coupled to the plurality of receive buffers and coupled to the plurality of link controllers wherein the comparison logic is operable to control the transmission blocker to prevent transmission of frames from the SATA device such that a next frame from an identified SATA device coupled to a transmitting link controller of the plurality of link controllers is held off if the native buffer associated with the transmitting link controller presently stores a received frame from another SATA device or is held off if any of the foreign buffers associated with the transmitting link controller presently store a received frame from the transmitting device.

13. The system of claim 12 wherein the status information includes connection status information relating to connections made with any of the plurality of link controllers and wherein the comparison logic is operable prevent granting of a connection request from a requesting SATA device over the transmitting link controller in response to a determination that the native buffer associated with the transmitting link controller presently stores a received frame from another SATA device or prevents granting of the connection request if any of the foreign buffers associated with the transmitting link controller presently store a received frame from the requesting device.

14. A method operable in a Serial Attached Small Computer System Interface/Serial Advanced Technology Attachment (SAS/SATA) controller adapted for coupling to a Serial Advanced Technology Attachment (SATA) device via a Serial Attached Small Computer System Interface (SAS) wide port of the controller through a wide port of a SAS expander, the wide port of the SAS/SATA controller comprising multiple links and the SAS/SATA controller having multiple receive buffers each associated with a corresponding one of the multiple links, the method comprising:
   receiving a frame from a transmitting SATA device via a link controller of the SAS wide port;
   storing the received frame in a receive buffer associated with the link controller;
   blocking frame transmissions from the transmitting SATA device such that at any particular point in time only one receive buffer of the plurality of receive buffers stores any frames received from the transmitting SATA device.

15. The method of claim 14 wherein the step of storing further comprises:
   setting a received frame indicator associated with the receive buffer to indicate presence of a received frame in the corresponding receive buffer; and
   setting a device identification (ID) indicator associated with the receive buffer to indicate the device ID of the transmitting SATA device that transmitted the received frame.

16. The method of claim 15 wherein the step of blocking further comprises:
   holding off setting a receiver ready status on the SAS wide port to prevent transmission of another frame from the transmitting SATA device.

17. The method of claim 16 further comprising:
   designating for each link of the multiple links a corresponding receive buffer as a native buffer for said each link; and
   designating all other receive buffers as foreign buffers for said each link.

18. The method of claim 17 wherein the step of holding off further comprises:
   holding off setting a receiver ready status on the SAS wide port to prevent transmission of another frame from the transmitting SATA device in response to detecting that the device ID of the SATA device attempting to transmit a next frame matches the device ID stored in the device ID indicator of any of the plurality of receive buffers where the associated received frame indicator is also set.

19. The method of claim 17 wherein the step of holding off further comprises:
   preventing transmissions of frames from a SATA device over a transmitting link of the plurality of links where the SATA device attempting to transmit a frame has a device ID value equal to the device ID value in the device ID indicator of any of the foreign buffers of the transmitting link that have the corresponding frame received indicator set or where the SATA device attempting to transmit a frame has a device ID value not equal to the device ID value in the device ID indicator of the native buffer of the transmitting link and the native buffer has its received buffer indicator set.

20. The method of claim 15 wherein the step of blocking further comprises:
   rejecting an open request from a transmitting device having a device ID matching the device ID stored in the device ID indicator of any of the plurality of receive buffers where the associated received frame indicator is also set.

* * * * *